Figure 1:
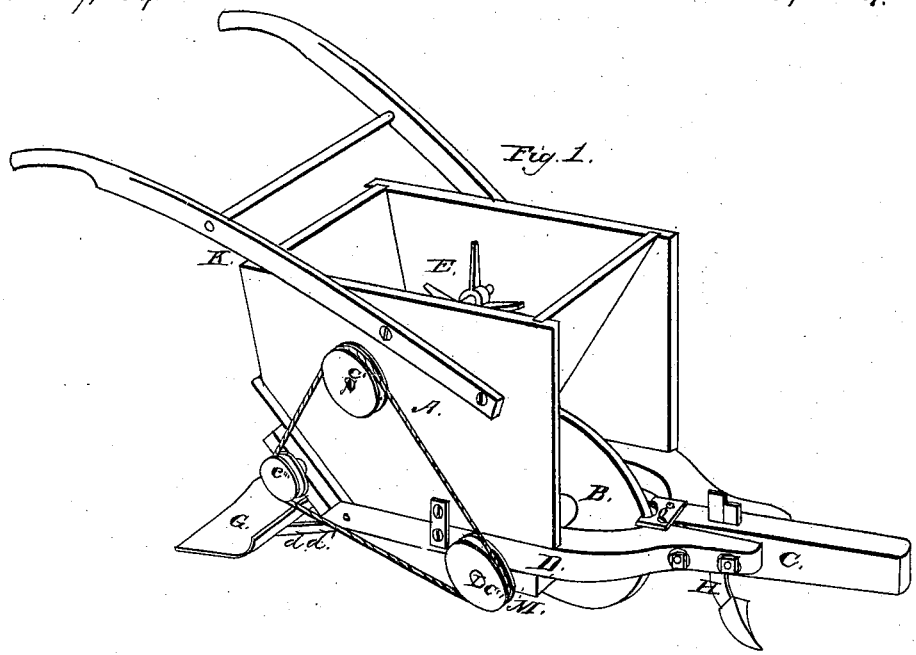

A. D. Brown, Sr.
Cotton Planter.

No. 87,089.        Patented Feb. 23, 1869.

Witnesses
J. T. Brown
A. Wyatt

Inventor
A. D. Brown
By W. G. Clemens
Atty

A. D. BROWN, SR., OF COLUMBUS, GEORGIA.

Letters Patent No. 87,089, dated February 23, 1869.

IMPROVEMENT IN MACHINE FOR PLANTING COTTON-SEED

The Schedule referred to in these Letters Patent and making part of the same.

*To whom it may concern:*

Be it known that I, A. D. Brown, Sr., of Columbus, Muscogee county, State of Georgia, have invented a new and useful Improvement in a Machine for Planting Cotton-Seed, and Distributing Guano, of which the following is a full description, &c., and the drawing—

Figure No. 1, exhibits the machine in perspective, ready for use.

Figure 2:
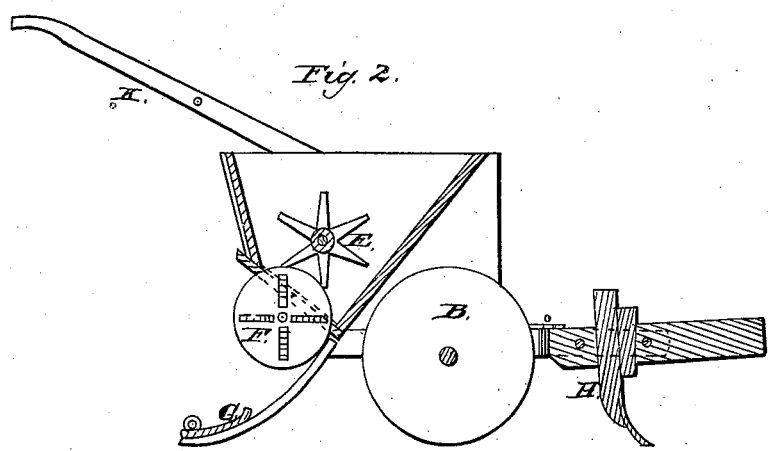

Figure 2, a side view, with the side broken away to show the devices within the hopper.

Figure 3:
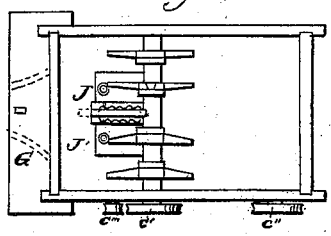

Figure 3, the agitator, adjustable plates J J', and covering-devices, with slide $a$ $a'$.

The nature and object of my invention consist in combining various devices to facilitate the planting of cotton-seed, in connection with, and at the same time, devices to distribute guano or any known fertilizer of the soil.

It is a fact well known to persons acquainted with planting cotton-seed, that the seed is found covered with a fibre that causes the seed to adhere, and in planting it, means are required to separate the seed, so that their distribution into the drill be uniform, which is one of the objects attained by my invention, and which, from experience, is found eminently successful; and To enable others skilled in the art of making and using machines of this character, I now proceed to describe its construction and operation, referring to the drawing accompanying this specification, and to the letters of reference found upon it.

A is the curb or hopper, into which the seed and guano are deposited, or the seed without the guano, or the guano without the seed, as occasion requires.

B is the wheel, on which the machine is moved, and serves to form the drill for the seed, &c.

C is the neap, or pole, to which the mules or horses are to be attached, and to which is appended, with an adjusting-wedge, an ordinary plow, or cultivator, to loosen and open the earth for the wheel B to move effectually from the drill, and prepare it for the seed.

D D' are the jaws or hounds, to which the shaft L is attached by blocks M, with screw, &c.

E is the agitator, attached to shaft N with its spiral arms, and working inside of the curb, or hopper, which, with the spiral arms, gives motion to the seed, and inclines them toward the centre of the hopper, and the opening between the adjustable plates and wheel F.

F is the wheel, formed with projecting points on each side of its surface, to draw out and separate the seed through the opening between the adjustable plates J J, as shown, that no more of the seed shall pass between them than is required by the operation, as before described.

G is the device for covering the seed, and is so formed that the soil is directed by the slides $d$ and $d'$, which are attached to the under side of plate G, so as to cover the seed. The soil is then levelled by plate G passing over, (after covering the seed,) to leave it in good condition for cultivation.

As before remarked, one of the objects of my improvement, and one on which its value depends, is the device for separating the cotton-seed from the fibre, and one which, from experience, it has been found very difficult to accomplish, for reasons stated, and for the economical use of the seed, which, in time of scarcity, is very important; and it has been found, from experience, that my machine is very successful in accomplishing this valuable result, as well as to show regular rows in the field.

Another important point gained by my machine, is the use of the single wheel, in place of the two in ordinary use.

In most new cotton-lands, stumps and trees are often found, which it is necessary to avoid by a short turn, and the use of the single wheel has been found very successful in this particular.

The wheel, by its location, is found valuable in setting down and forming the drill for the reception of the seed, and to produce uniformity in planting, and the management of it, by the long arms K, is very easy and in every respect effective; and another point gained is, its construction is very simple, and device so plain, that it can be made by any one, of ordinary mechanical skill, and at such cost as will enable all to buy and use it, which renders it particularly valuable in the present condition of the finances of the cotton-growing States.

Whenever its use is required in lands that are smooth and without stumps, several of the machines may be so constructed as to be united, and two, three, or four rows planted at one time.

What I claim as my invention, and wish to secure by Letters Patent of the United States is, in a combined cotton-seed planter and guano-distributer, as described—

1. The wheel F, provided with projections on its sides, with its short shaft and bearings, devices for communicating motion, and the adjustable plates J J', as and for the purposes set forth.

2. The centre wheel B, with its bearings, hounds D, pole, or neap C, plow H, with its adjusting-wedge, plate G, with its slides or runners $d$ $d'$, agitator E, with its spiral arm, wheel F, with its projections, hopper A, and handles K, together with the devices for communicating motion, for the purpose described.

A. D. BROWN, Sr.

Witnesses:
 Israel F. Brown,
 W. G. Clemons.